Feb. 21, 1939.   J. H. PETERS   2,148,086
AUTOMOBILE BODY AND SEAT CONSTRUCTION
Original Filed March 23, 1936   2 Sheets-Sheet 1
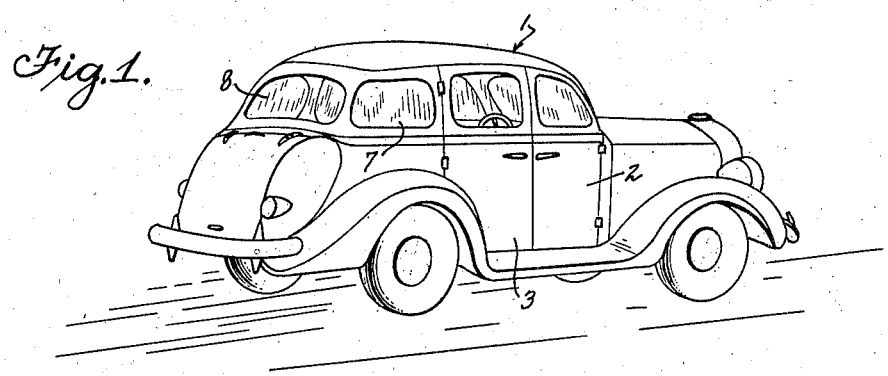
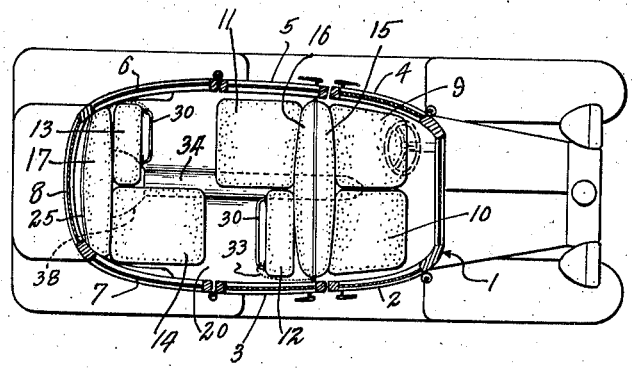 
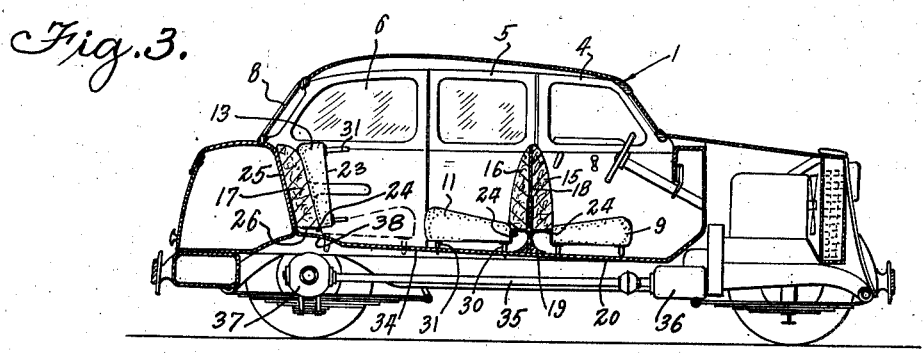
INVENTOR.
Joseph H. Peters
BY Lyon & Lyon
ATTORNEYS Feb. 21, 1939.　　　J. H. PETERS　　　2,148,086

AUTOMOBILE BODY AND SEAT CONSTRUCTION

Original Filed March 23, 1936　　2 Sheets-Sheet 2

INVENTOR.
Joseph H. Peters
BY Lyon & Lyon
ATTORNEY.

Patented Feb. 21, 1939

2,148,086

UNITED STATES PATENT OFFICE 2,148,086

AUTOMOBILE BODY AND SEAT CONSTRUCTION

Joseph H. Peters, Hawthorne, Calif.

Application March 23, 1936, Serial No. 70,231
Renewed July 29, 1938

3 Claims. (Cl. 296—64)

This invention relates to the construction and arrangement of seats in automobiles and has as a broad object to provide greater comfort and enjoyment for the passengers and also to make the passenger compartment better adapted for carrying luggage or the like when it is not carrying its full complement of passengers.

Heretofore, to the best of my knowledge, it has been customary to provide two-seated automobile bodies with a front seat and a rear seat spaced therefrom, and both facing forward. It has also been the custom to provide the rear seat, at least, with a permanent base built into the floor of the automobile. With such construction the passengers in the rear compartment could only sit facing forwardly.

I have discovered that it is often much more pleasant for the passengers of the rear compartment of a two-seated automobile to sit facing the rear, their seat being arranged back-to-back with respect to the front seat. This permits the passengers a clear, unobstructed view through the rear windows of the automobile (which window is preferably made larger than has previously been the custom), and gives the same sensation as riding on the observation platform of the train. It also permits easier riding because the seat is positioned further forward of the rear wheels than in the ordinary construction.

In accordance with my invention, I make it possible for the passengers to sit facing the rear, as described in the preceding paragraph, or to sit facing the front, at their option, by providing a rear seat which is not anchored or built into the floor, and may be folded up against the backrest to leave the floor clear, and then provide an auxiliary folding seat back-to-back with the front seat. By folding up the rear seats, and lowering the auxiliary seats, passengers may sit facing the rear and have normal leg room, or, by lowering the rear seats and folding up the auxiliary seats the passengers may sit facing forwardly and have the same leg room as before.

I am aware that automobiles, particularly taxicabs, have been equipped with auxiliary seats facing the rear for extra passengers; but such an arrangement is impracticable in automobile bodies of ordinary dimensions because the rear and auxiliary seats would substantially meet, leaving no leg room for the passengers. It is is, therefore, an important feature of my system that the rear seat can be folded up out of the way when the auxiliary seats are occupied, leaving the floor clear for the legs and feet of the passengers occupying the seats in use.

By making the rear seat of folding construction the auxiliary seat may be made as large and as well upholstered as the remaining seats of the automobile and permit equal comfort, whether the passengers are sitting facing rearwardly or facing forwardly.

If desired, both the rear and auxiliary seats may be folded up, leaving the entire floor clear for the support of baggage or other objects.

I also prefer to divide the rear and auxiliary seats so that each half is independently movable. By folding one-half of the rear seat, lowering the half of the auxiliary seat opposite thereto, and lowering the other half of the rear seat and folding the other half of the auxiliary seat, two passengers can sit facing each other, thereby facilitating conversation.

In addition to the general features outlined, the invention includes details of construction of folding seats which are particularly adapted to and make practicable the general arrangement described. These features will be described in the detail specification which follows:

In the drawings:

Figure 1 is a perspective view of the exterior of an automobile, in accordance with the invention, showing the enlarged rear and side windows for facilitating rear vision.

Fig. 2 is a horizontal section view of the automobile shown in Fig. 1, showing in plan the seating arrangement;

Fig. 3 is a longitudinal vertical sectional view through the automobile shown in Figs. 1 and 2, and further illustrating the construction and arrangement of the seats;

Figure 4:
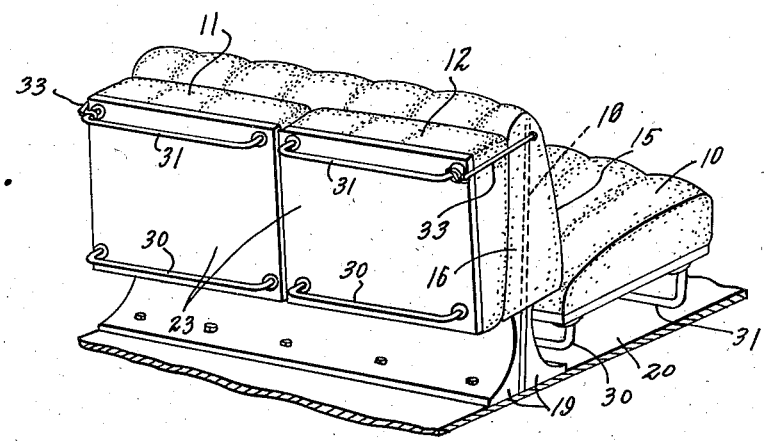
Fig. 4 is a detail, perspective view of the front and auxiliary seats in the automobile shown in Figs. 1, 2 and 3.

Referring to Figs. 1, 2 and 3, there is depicted therein an automobile having a closed body 1 defining a passenger compartment of elongated shape in accordance with usual sedan and coach type bodies. As shown, the body comprises four doors, 2, 3, 4 and 5, each having a window in the upper portion thereof and the rear portion of the body back of the doors is provided with large side windows 6 and 7, respectively, on opposite sides and a large rear window 8 to permit as complete vision as possible rearwardly. The construction of the portions of the automobile exterior of the passenger compartment, is of no moment in connection with the present invention and may conform to standard practice. The passenger compartment as shown in Fig. 2 is provided with a front seat divided into two separate halves 9 and 10, respectively, a pair of auxiliary seats 11 and 12, respectively, positioned immediately back of the front seats, and a pair of rear seats 13 and 14, respectively, in the rear end of the compartment. The seats 11 and 12, although separate and independently movable, are preferably shaped to fit close together and provide a substantially continuous seating surface when in use. The rear seats 13 and 14 are similarly constructed.

A single continuous back-rest 15 is provided for the seats 9 and 10 and likewise a continuous back-rest 16 is provided for the auxiliary seats 11 and 12, and a continuous back-rest 17 for rear seats 13 and 14.

Figure 5:
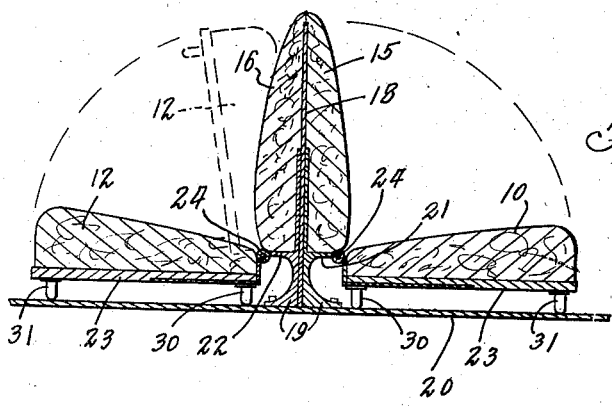
Fig. 5 is a detail side elevation view of the seat shown in Fig. 4.

As shown in Figs. 3, 4 and 5, the back-rests 15 and 16 are mounted back-to-back with respect to each other and supported by a single frame member 18 extending upwardly therebetween and terminating at the lower end in a base 19 which is permanently anchored to the floor 20 of the automobile body. The back-rests 15 and 16 proper consist of cushions which may be so shaped as to provide maximum comfort. Thus these cushions are preferably substantially thicker at the bottom than at the top to provide inclined surfaces. The base 19 is extended upwardly and outwardly immediately below the lower edges of the back-rests 15 and 16 to provide rigid supporting members 21 and 22, respectively, to which the inner ends of the front seats 9 and 10 and the auxiliary seats 11 and 12 are hingedly connected. Thus each of the seats 9, 10, 11 and 12 may consist of a substantially flat rigid base 23 which is extended upwardly at the rear edge of the seat and there connected by a hinge 24 to the adjacent frame members 21 and 22, thereby permitting the seats to be folded up against their associated back-rests by swinging them on the hinges 24.

The rear back-rest 17 may be anchored directly to the rear wall 25 of the automobile body but it likewise is provided with a rigid frame member 26 extending along the under edge of the back-rest where it is connected by a hinge 24 to the base 23 of the rear seats 13 and 14, permitting them to be folded up against the back-rests 17. None of the seats are attached to the floor 20 so that each and every seat may be folded up against its associated back-rest, thereby leaving the floor space normally covered by the seat perfectly clear. However, it is highly desirable that the seats, when in lowered position, be supported directly from the floor, instead of by the hinges 24. To this end the base 23 of each seat is provided with a pair of laterally extending rods 30 and 31, positioned adjacent the inner and the outer edges, respectively, of the base 23. Each of the rods 31 may consist of a tubular member bent inwardly at the ends to the base 23 and firmly anchored to the latter. When any one of the seats is in lower position, the rods 30 and 31 rest directly on the floor and carry the full weight of the seat and the occupant thereof, thereby relieving the hinge 24 of any appreciable strain. However, when the seats are folded up against their associated back-rests, as shown in Fig. 4, the rods 30 and 31 project out from the base 23 of the seat and function as foot rests and robe rails, respectively.

The seats may be retained in folded position by various latch arrangements, which will suggest themselves to those skilled in the art. A simple latch arrangement is illustrated in Fig. 4, and simply comprises a strap or cord 33 anchored at one end to the end of the associated back-rest and having a buckle or hook at the other end, whereby it may be secured to the end of the rail 31.

Figure 6:
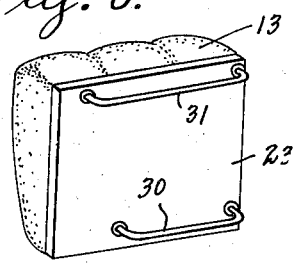
Fig. 6 is a detail view of one of the folding seats in the upper position.

It is desirable in automobile construction to provide a low center of gravity to increase the stability of the automobile. To this end, it is the frequent practice to position the major portion of the floor so low that a tunnel 34 must be provided extending longitudinally through the rear portion of the passenger compartment to accommodate the propeller shaft 35 extending from the transmission 36 (Fig. 3) to the differential housing 37 of the rear axle. It is likewise necessary to provide a dome 38 in the floor immediately above the differential 37 to provide clearance for the latter. With this construction it may be necessary to shorten the rods 30 and 31 on the rear seats 13 and 14, as shown in Fig. 6, to provide clearance for the tunnel 34 and dome 38.

Figure 7:
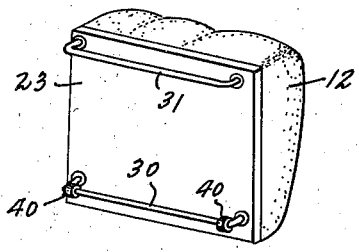
Fig. 7 is a detail view similar to Fig. 6, but showing a modified form of the construction.

Since the inner rail 30 of each seat swings through a relatively short radius about the hinge 24 when the seat is lowered, the rail will tend to slide over the floor as the seat reaches full lowermost position. To reduce friction as the result of this motion, and also to prevent wear on the floor, which may be carpeted, rollers 40 may be provided on the inner rod 30, as shown in Fig. 7. The rollers 40 may be constructed of rubber, or have rubber tires thereon, to prevent direct sliding motion of the rollers against the floor of the car as the seat is lowered into position. All of the seats 11, 12, 13 and 14 in the rear compartment of the automobile may be raised or lowered. However, most automobile bodies are of such limited longitudinal dimensions that with all of the seats lowered, there would be no room between the rear edges of the seat 11 and 12 and the front edges of the seats 13 and 14. As a matter of fact, if desired, these seats may be proportioned so that they come together and form a continuous upholstered surface which may be used as a bed, if desired. Likewise, if the space is unusually restricted, the seats may be made of such longitudinal dimensions that they would interfere with each other if all were lowered at once, so that the size of the seats and their comfort in that respect, is not restricted by the dimensions of the body since it is intended that any seat shall be folded up and out of the way when the seat opposite thereto is in use. When both of the auxiliary seats 11 and 12 are down, the rear seats 13 and 14 would be folded up and the rails 30 and 31 thereon then function as foot-rests and robe rails. Likewise, when the rear seats 13 and 14 are down and occupied, the auxiliary seats 11 and 12 will be folded up and out of the way and the rods 30 and 31 thereon then function as foot-rests and robe rails. If desired, all of the seats, except the driver's seat 9, may be folded up out of the way, leaving a large area of floor space for the stacking of luggage or other objects it is desired to transport.

A particularly effective arrangement, when only two passengers are occupying the rear compartment, is shown in Fig. 2, one of the auxiliary seats 11 and one of the rear seats 14 being lowered to the juxtaposed seats 12 and 13 being raised. This permits the passengers to sit facing each other.

As previously indicated, one of the advantages of employing auxiliary seats 11 and 12, as described, is that the passengers sit facing rearwardly, so that they have an unobstructed view through the back of the car. In order to make this view as full as possible, it is desirable to make the rear side windows 6 and 7 and the rear window 8 of larger dimensions than is customary at present. In the drawings, the side windows 6 and 7 have been shown curved. This of course is not essential. It provides a more complete vision.

With the seating arrangement described, the usual door arrangement may be employed, since entry into the passenger compartment through the rear doors 3 and 5 may be effected by folding up the adjacent auxiliary seat 11 or 12.

Although for most purposes I believe that divided seats as shown in the drawings are preferable this construction is not essential and the auxiliary seats 11 and 12 may be constructed as a single seat extending clear across the body and the rear seats 13 and 14 may likewise be constructed as a single seat extending clear across the body, if so desired. Obviously the front seats 9 and 10 may be constructed as a single unit and in fact this seat may be made rigid instead of folding. The advantage of having the seat divided, and the seat 10 at least made folding, is that this seat may then be folded out of the way for the accommodation of baggage.

Although I have described a preferred embodiment of the invention, it is understood that various modifications may be made in the specific construction disclosed without departing from the invention and likewise certain details of the said construction may be employed in different body arrangements. The invention, therefore, is to be limited only as set forth in the appended claims.

I claim:

1. In an automobile body having a rear passenger compartment dimensioned laterally to accommodate a plurality of persons seated side-by-side, but of length sufficient only to accommodate a single row of persons, the seat arrangement and construction which comprises; a forwardly facing seat having a stationary back-rest positioned against the rear end of the compartment, a rearwardly facing seat having a stationary back-rest positioned against the front end of the compartment, means for supporting each of said seats for swinging movement from a lower operative position, in which it rests upon the floor of the compartment, into a raised position parallel to and lying against its associated back-rest, whereby passengers may occupy either of said seats and thereby sit facing either forwardly or rearwardly and the unoccupied seat may be raised clear of the floor to provide equal leg room for the passengers whether they occupy the rearwardly facing or the forwardly facing seat.

2. In an automobile body, wall and floor means defining an elongated passenger compartment, a front seat in said compartment having a back-rest extending upwardly from the rear edge thereof, an auxiliary back-rest facing rearwardly and positioned back-to-back with the back-rest of said front seat, a rear back-rest positioned against the rear wall of said compartment and facing forwardly, a rear seat and means hingedly securing said rear seat at the rear edge thereof to the lower edge of said rear back-rest for swinging movement from an elevated or folded position alongside of and in front of said back-rest, into a lowered position extending forwardly from the lower edge of said back-rest, an auxiliary seat and means hingedly securing it at the forward edge thereof to the lower edge of said auxiliary back-rest for swinging movement from elevated position alongside said back-rest to lower position extending rearwardly from the lower edge of said back-rest, whereby passengers may occupy said back seat or said auxiliary seat and thereby sit facing either forwardly or rearwardly and the unoccupied seat may be raised clear of the floor to provide leg room for the passengers occupying the other seat.

3. The seating arrangement and construction as described in claim 1, in which each seat is divided into two independently movable sections, whereby the section of one seat on one side of the compartment of the second of the other seat on the other side of the compartment, may be simultaneously in lower position for use and the remaining seat sections raised to provide leg room for the occupants of the lowered seats.

JOSEPH H. PETERS.